(12) United States Patent
Sano

(10) Patent No.: US 7,194,356 B2
(45) Date of Patent: Mar. 20, 2007

(54) ROUTE SEARCH METHOD IN NAVIGATION SYSTEM

(75) Inventor: Katsumi Sano, Zama (JP)

(73) Assignee: Xanavi Informatics Corporation, Zami (JP)

( * ) Notice: Subject to any disclaimer, the term of this patent is extended or adjusted under 35 U.S.C. 154(b) by 164 days.

(21) Appl. No.: 10/915,355

(22) Filed: Aug. 11, 2004

(65) Prior Publication Data

US 2005/0071080 A1 Mar. 31, 2005

(30) Foreign Application Priority Data

Aug. 12, 2003 (JP) ............................ 2003-292292

(51) Int. Cl.
*G01C 701/209* (2006.01)
(52) U.S. Cl. ...................................... 701/209
(58) Field of Classification Search ................. 701/209
See application file for complete search history.

(56) References Cited

U.S. PATENT DOCUMENTS 6,295,503 B1 9/2001 Inoue et al.
6,470,266 B1* 10/2002 Ito et al. ..................... 701/209
2001/0021895 A1* 9/2001 Yamazaki ................... 701/211

FOREIGN PATENT DOCUMENTS

JP 2000-131085 5/2000

* cited by examiner

*Primary Examiner*—Thu V. Nguyen
(74) *Attorney, Agent, or Firm*—Antonelli, Terry, Stout and Kraus, LLP.

(57) ABSTRACT

A navigation system comprises a storage device which stores link data of each of links constituting roads on a map. As for a carpool link defined as a link allowing only a vehicle in which a plurality of persons are riding to pass through, the link data contains information indicative thereof. The navigation system searches for a recommended route from a departure place to a destination by use of the link data. If the links constituting the recommended route includes a carpool link, the navigation system receives an input of the number of person-on-board. The navigation system searches for a recommended route once again by use of the link data, from the departure place to the destination comprising the links passable with the number of person-on-board received by the receive step.

8 Claims, 9 Drawing Sheets

IN-VEHICLE TYPE NAVIGATION SYSTEM 1000

ROUTE SEARCH METHOD IN NAVIGATION SYSTEM

BACKGROUND OF THE INVENTION

The present invention relates to a navigation system, and more particularly, it relates to a route search technique in an in-vehicle type navigation system.

The Japanese Patent Laid-open Publication No. 2000-28382 (hereinafter, referred to as "Patent Document 1") discloses an in-vehicle type navigation system which searches for a guidance route from a departure place to a destination on the basis of map data, in particular, placing a higher priority on either a local street or a highway.

SUMMARY OF THE INVENTION

In the technique described in the Patent Document 1, searching for the guidance route is conducted without considering how many persons are riding in the vehicle.

In recent years, ride sharing (carpool) is recommended for the purpose of alleviating congested traffic conditions. Further, a traffic lane exclusive to a vehicle in which a specific number of persons are riding is placed on a road. This type of traffic lane is called as "carpool lane". In conventional arts, searching for a route has been conducted without taking the existence of such carpool lane into account. Therefore, there has been a case that a recommended route thus searched out may include a road (link) through which a vehicle with the actually riding number of persons is not allowed to pass. In such a case, if all the traffic lanes on the link are the carpool lanes, the user is not allowed to pass through the link, and has to change the route. However, since the user is informed about such necessity of changing the route by a sign and the like, immediately before the impassable link, it has been inconvenient for the user. As thus described, in the conventional navigation system, searching for a recommended route has not been satisfactorily conducted, well considering actual conditions.

The present invention has been made in view of the situation above, and an object of the present invention is to provide a technique for searching for a recommended route, considering the number of persons riding in the vehicle.

In order to solve the problem as described above, a route search method in an in-vehicle type navigation system according to the present invention is configured as the following. The in-vehicle type navigation system has a storage device which stores map data including link data of each of links constituting the roads on the map. As for a carpool link, defined as a link allowing only a vehicle in which a plurality of persons are riding to pass through, the link data contains the information indicative thereof. Then, the navigation system utilizes the link data so that the carpool link is excluded, and searches for a recommended route from a departure place to a destination.

The route search method in the in-vehicle type navigation system according to the present invention is further configured as the following. The in-vehicle type navigation system has a storage device which stores map data including link data of each of links constituting the roads on the map. As for a carpool link, defined as a link allowing only a vehicle in which a plurality of persons are riding to pass through, the link data contains the information regarding the number of person-on-board required for passing through the carpool link. Then, the navigation system utilizes a number of person-on-board setting step, together with the link data, and conducts a search for a recommended route from a departure place to a destination, comprising the links passable with the number of person-on-board set in the number of person-on-board setting step.

The route search method in the in-vehicle type navigation system according to the present invention is further configured as the following. The in-vehicle type navigation system has a storage device which stores map data including link data of each of links constituting the roads on the map. As for a carpool link, defined as a link allowing only a vehicle in which a plurality of persons are riding to pass through, the link data contains the information indicative thereof. The navigation system performs a recommended route search step which utilizes the link data and searches for a recommended route from a departure place to a destination, and if a carpool link is included in the links which constitute the recommended route, the navigation system performs a message output step which outputs a message informing the user that the carpool link is included in the links constituting the recommended route.

The route search method in the in-vehicle type navigation system according to the present invention is further configured as the following. The in-vehicle type navigation system has a storage device which stores map data including link data of each of links constituting the roads on the map. As for a link including a carpool lane, defined as a lane allowing only a vehicle in which a plurality of persons are riding to pass through, the link data contains the information indicative thereof. Then, the navigation system utilizes the link data, so as to perform a recommended route search step which searches for a recommended route from a departure place to a destination and a display step which displays the recommended route. If a link constituting the recommended route includes a carpool lane, the display step displays the link including the carpool lane in a display mode different from the other links.

The route search method in the in-vehicle type navigation system according to the present invention is further configured as the following. In the route search method in the in-vehicle type navigation system, the navigation system has a storage device which stores map data including link data of each of links constituting the roads on the map. As for a carpool link, defined as a link allowing only a vehicle in which a plurality of persons are riding to pass through, the link data contains the information indicative thereof. The navigation system utilizes the link data, and performs a recommended route search step which searches for a recommended route from a departure place to a destination. If the carpool link is included in the links constituting the recommended route, the navigation system further performs a receiving step which receives an input of the number of person-on-board, and a recommended route search step which utilizes the link data and searches for a recommended route from a departure place and a destination, comprising the links passable with the number of person-on-board received in the receiving step.

The route search method in the in-vehicle type navigation system according to the present invention is further configured as the following. The in-vehicle type navigation system has a storage device which stores map data including link data of each of links constituting the roads on the map. As for a link including a carpool lane, defined as a lane allowing only a vehicle in which a plurality of persons are riding to pass through, the link data contains the information indicative thereof. Then, the navigation system utilizes the link data, performs a recommended route search step which searches for a recommended route from a departure place to a destination, and a display step which displays the recommended route on a map around the current position, based on current position information detected by a current position detecting function. If the links constituting the recommended route displayed in the display step include a link containing the carpool lane, the navigation system outputs a message to inform a user, before arriving at the link including the carpool lane, that there is a carpool lane in the recommended route.

Furthermore, the storage device stores information of the number of person-on-board by day and time, and the number of person-on-board setting step may select the number of person-on-board corresponding to the current day and time, out of the number of person-on-board information stored in the storage device, and set the selected information as the number of person-on-board.

DETAILED DESCRIPTION OF THE PREFERRED EMBODIMENTS

One embodiment of the present invention will be explained with reference to the attached drawings.

Figure 1:
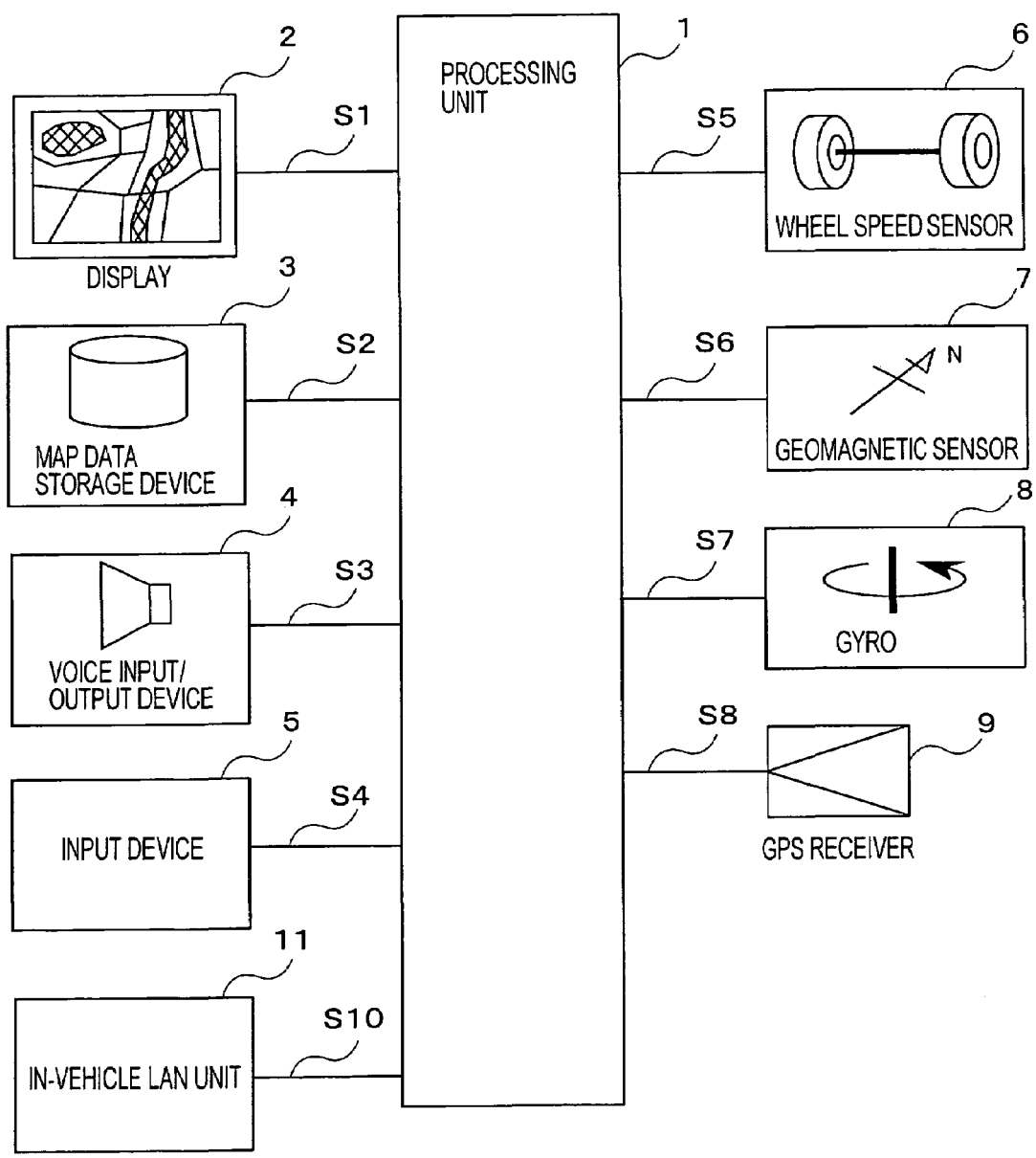
FIG. 1 is schematic diagram of an in-vehicle type navigation system to which one embodiment of the present invention has been applied.

FIG. 1 is a schematic diagram of the in-vehicle type navigation system to which one embodiment of the present invention has been applied.

As shown in FIG. 1, the in-vehicle type navigation system according to the present embodiment comprises a processing unit 1, a display 2, a map data storage device 3, a voice input/output device 4, an input device 5, a wheel speed sensor 6, a geomagnetic sensor 7, a gyro sensor 8, a GPS (Ground Positioning System) receiver 9, and an in-vehicle LAN unit 11.

The processing unit 1 is a central unit which conducts various processing. For example, it detects a current position on the basis of the information outputted from the various sensors 6 to 8 and the GPS receiver 9, and reads map data required for displaying from the map data storage device 3 according to the current position information thus obtained. In addition, the processing unit 1 expands the map data 310 thus readout to graphics to be displayed on the display 2, with a mark superimposing thereon which indicates the current position. The processing unit 1 further utilizes the map data 310 stored in the map data storage device 3, searches for an optimum route (recommended route) which connects a destination indicated by the user with a departure place (for example, the current position), and guides the user by use of the voice input/output device and the display 2.

The display 2 is a unit which displays the graphics information generated in the processing unit 1, and comprises a CRT, a liquid crystal display, and the like. It is general that a signal S1 to connect the processing unit 1 with the display 2 is a RGB code or NTSC (National Television System Committee) signal.

The map data storage device 3 comprises a recording medium, such as CD-ROM, DVD-ROM, HDD, and IC card. This storage medium stores the map data.

Figure 2:
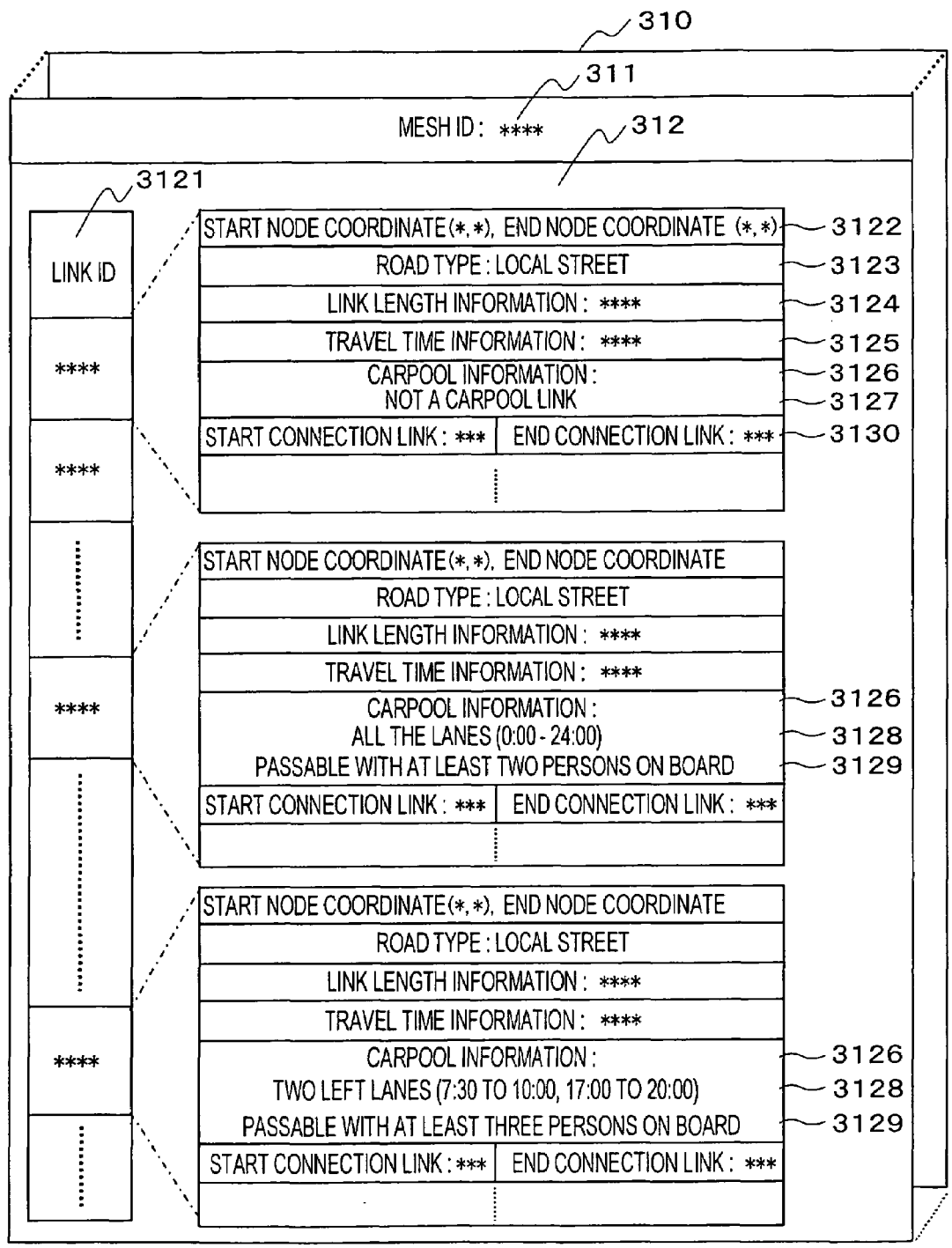
FIG. 2 is a diagram showing a configuration example of map data stored in a map data storage device 3.

FIG. 2 is a diagram showing a configuration example of the map data stored in the map data storage device 3. As illustrated, the map data 310 is stored with respect to each of mesh areas which are obtained by dividing the map into a plurality of areas. The map data 310 includes an identification code of the mesh area (mesh ID) 311 and link data 312 of each of the links constituting the roads contained in the mesh area. The link data 312 comprises a link identification code (link ID) 3121, coordinate information 3122 of two nodes (start node and end node) constituting a link, road type information 3123 including the link, link length information 3124 indicating the length of the link, travel time (or moving velocity) information 3125 of the link, carpool information 3126, link IDs (connection link IDs) 3130 respectively connected with the two nodes, and the like.

If the link does not include a carpool lane, the carpool information 3126 contains information 3127 indicating that the link is not a carpool link. On the other hand, if the link includes a carpool lane, the carpool information 3126 includes information 3128 which lane is the carpool lane and information 3129 regarding the number of person-on-board required for passing through the carpool lane. Furthermore, if a time zone is fixed, during the period of which a lane is used as a carpool lane, information regarding such time zone is also contained in the carpool information 3126.

It is to be noted here that a distinction between two nodes constituting a link may be made by setting one node as a start node and the other node as an end node, whereby up-direction and down-direction on the same road can be managed as two links different from each other. The map data 310 contains information of map constituent items other than the roads included in a corresponding mesh area, such as a name, category, coordinate information and the like.

Referring to FIG. 1 again, explaining the present embodiment will be continued. The voice input/output device 4 performs processing to convert a message to the user generated in the processing unit 1 into a voice signal and output the thus converted signal. The voice input/output device also performs processing to recognize a voice from the user so that the description thereof is transferred to the processing unit 1.

The input device 5 is a unit to receive an instruction from the user, and comprises hardware switches such as a scrolling key and a scale change key, a joystick, a touch panel placed on the display, and the like.

The sensors 6 to 8 and the GPS receiver 9 are utilized to detect a current position (user's vehicle position) on the in-vehicle navigation system. The wheel speed sensor 6 measures a distance according to a product by multiplying the circumference of the wheel and the number of revolutions of the wheel which is subjected to the measurement. Further, an angle at which the moving object makes a turn is measured according to a difference between the number of revolutions of the pertinent wheel and that of the other wheel in a pair. The geomagnetic sensor 7 senses a magnetic field held by the earth, and detects the bearings of the moving object. The gyro 8 comprises an optical fiber gyro, a vibration gyro, and the like, and detects an angle at which the moving object makes a turn. The GPS receiver 9 receives a signal from three or more GPS satellites, and measures distances between the vehicle and each of the GPS satellites and change rates of the distances, to measure a current position, a travel direction and a travel azimuth of the moving object.

Figure 3:
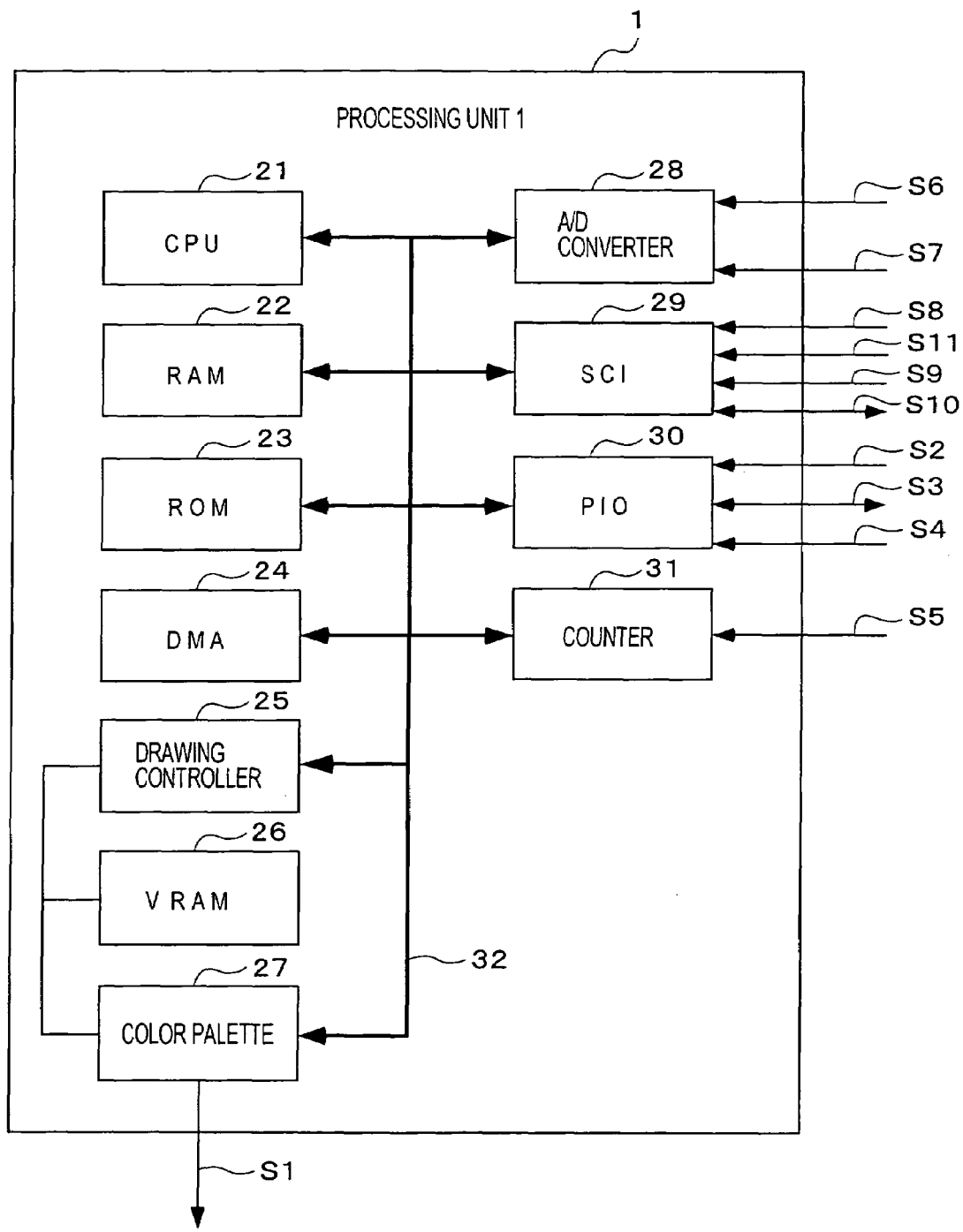
FIG. 3 is a diagram showing a hardware configuration of a processing unit 1.

FIG. 3 is a diagram showing a hardware configuration of the processing unit 1.

As is shown, the processing unit 1 has such a structure that various devices are connected to one another through a bus 32. The processing unit 1 comprises a CPU (Central Processing Unit) 21 which performs various processing such as controlling the numerical calculation and each device, a RAM (Random Access Memory) 22 which stores map data, statistical traffic data, and computational data which are read out from the map data storage device 3, a ROM (Read Only Memory) 23 which stores programs and data, a DMA (Direct Memory Access) 24 which performs data transmission between memories and between each memory and each device, a drawing controller 25 which performs graphics drawing and also performing display control, a VRAM (Video Random Access Memory) 26 which stores graphics image data, a color pallet 27 which converts image data to RGB signals, an A/D converter 28 which converts analog signals to digital signals, an SCI (Serial Communication Interface) 29 which converts serial signals to parallel signals which are synchronized with the bus, a PIO (Parallel Input/Output) 30 which inputs the parallel signals on the bus in synchronism with the bus, and a counter 31 which integrates pulse signals.

Figure 4:
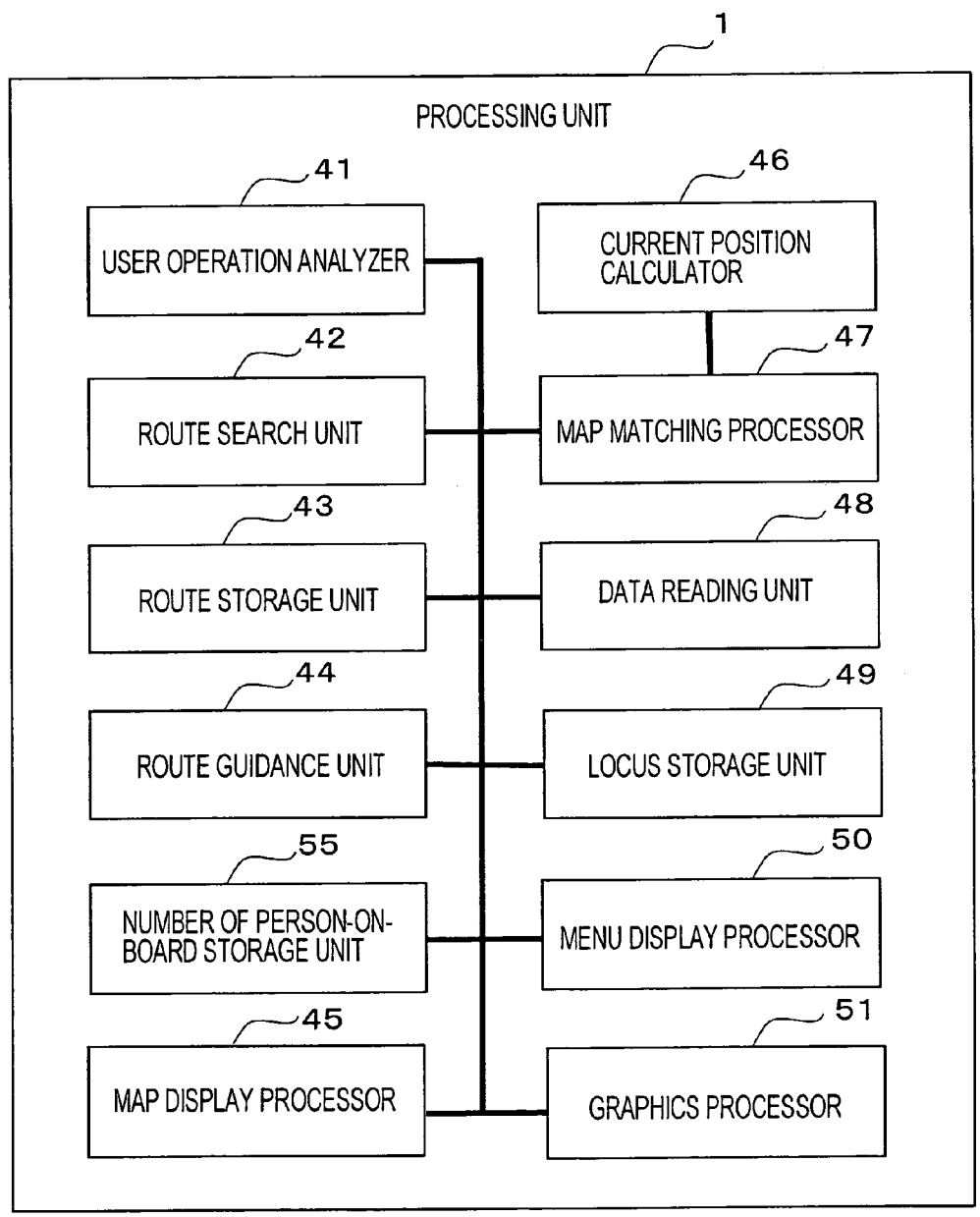
FIG. 4 is a diagram showing a functional configuration of the processing unit 1.

FIG. 4 is a diagram showing a functional structure of the processing unit 1.

As shown in FIG. 4, the processing unit 1 comprises a user operation analyzer 41, a route search unit 42, a route storage unit 43, a route guidance unit 44, a map display processor 45, a current position calculator 46, a map matching processor 47, a data reading unit 48, a locus storage unit 49, a menu display processor 50, a graphics processor 51, and a number of person-on-board storage unit 55.

The current position calculator 46 performs processing of utilizing distance data and angle data, which are obtained by integrating each of the distance pulse data S5 measured in the wheel speed sensor 6 and the angular acceleration data S7 measured in the gyro 8, and further integrating those data items on the time axis to periodically calculate the current position (X', Y') after the vehicle runs from an initial position (X, Y), and outputs the current position to the map matching processor 47. Here, in order to provide consistency between an angle at which the vehicle turns and a travel azimuth of the vehicle, an absolute azimuth in the travel direction of the vehicle is estimated by referring to azimuth data S6 obtained from the geomagnetic sensor 7 and angle data obtained by integrating the angular acceleration data S7 obtained from the gyro 8. Since errors are gradually accumulated as the data of the wheel speed sensor 6 and the data of the gyro 8 are respectively integrated, the processing of canceling the accumulated errors on the basis of position data S8 obtained from the GPS receiver 9 is performed periodically, and the current position information is outputted to the map matching processor 47.

The map matching processor 47 performs map matching processing for collating a travel locus stored in the locus storage unit 49 described later with map data surrounding the current position which is read by the data reading unit 48, to set the current position outputted from the current position calculator 46 onto a road (link) having the highest correlation in shape. Since the current position information obtained by the current position calculator 46 includes sensor errors, map matching processing is performed for the purpose of enhancing the positional accuracy. Accordingly, in many cases, the current position is set to agree with the road on which the vehicle is running.

The locus storage unit 49 stores as locus data the current position information which has been subjected to the map matching processing in the map matching processor 47 every time the vehicle runs for a predetermined distance. The locus data is used to draw a locus mark on a road which is located on the corresponding map and on which the vehicle has run so far.

The user operation analyzer 41 receives a user's request inputted into input device 5 to analyze the description of the request. It controls each of the constituent units of the processing unit 1 so that a processing corresponding to the description of the request is performed. For example, when the user requests to search for a recommended route, the user operation analyzer 41 requests the map display processor 45 to perform a processing of displaying a map on the display 2 for the purpose of setting a departure place and a destination, and further requests the route search unit 42 to perform a processing of calculating a route from the departure place to the destination.

The route search unit 42 searches the map data for a route to reach the destination at the minimum cost (for example, travel time and travel distance) out of routes connecting two specified points (the current position and the destination), by use of the Dijkstra method or the like, and stores the searched route as a recommended route in the route storage unit 43.

The route guidance unit 44 compares information of the recommended route stored in the route storage unit 43 with the current position information outputted from the map matching processor 47, and informs a user of a recommended route with voice using the voice input/output device 4 whether a vehicle should go straight on or turn to the right or left before passing a crossing, and/or by indicating a travel direction on a map displayed on the display 2.

Further, the route guidance unit 44 utilizes the current time and the map data stored in the map data storage device 3 to calculate an expected travel time from the current position outputted from the map matching processor 47 to the destination. Then, it adds the expected travel time thus calculated to the current time to calculate an expected point of time for arrival at the destination, and informs the user of the time.

Further, the route guidance unit 44 measures an actual travel time required from the departure place of the recommended route to the current position outputted from the map matching processor 47. Then, the route guidance unit 44 compares the actual travel time with the cost for the section between the departure place and the current position, out of the cost used by the route search unit 42 in searching the recommended route, and judges the need of searching for a recommended route again in accordance with the result of comparison. When the need of searching for a recommended route again is determined, the route guidance unit 44 requests the route search unit 42 to search for a recommended route again with the current position outputted from the map matching processor 47 as a departure place and with the current time as a departure time.

The data reading unit 48 operates to be prepared for reading from the map data storage device 3, map data in an area which is requested to be displayed on the display 2 or in an area which is requested for the purpose of searching for a route (an area covering the departure place and the destination).

The map display processor 45 receives from the data reading unit 48, the map data in an area which is requested to be displayed on the display 2, and generates map drawing commands so that the graphics processor 51 draws a road, other map constituents, the current position, the destination, and marks such as an arrow for a recommended route, in an instructed scale and in an instructed drawing mode.

The menu display processor 50 receives a command outputted from the user operation analyzer 41, and generates menu drawing commands so that the graphics processor 51 draws various types of menus and graphs.

The graphics processor 51 receives commands generated in the map display processor 45 and the menu display processor 50, and expands an image in the VRAM 26, as to the image data to be displayed on the display 2.

The number of person-on-board storage unit 55 stores the number of persons riding on the vehicle, which is inputted by the user via the input device 5 and the like. If there is no particular input, the number of person-on-board is stored with the value "1 (a driver)".

EXPLANATION OF OPERATIONS

Next, an operation of the in-vehicle type navigation system will be described. Firstly, a searching operation for a recommended route will be explained.

Figure 5:
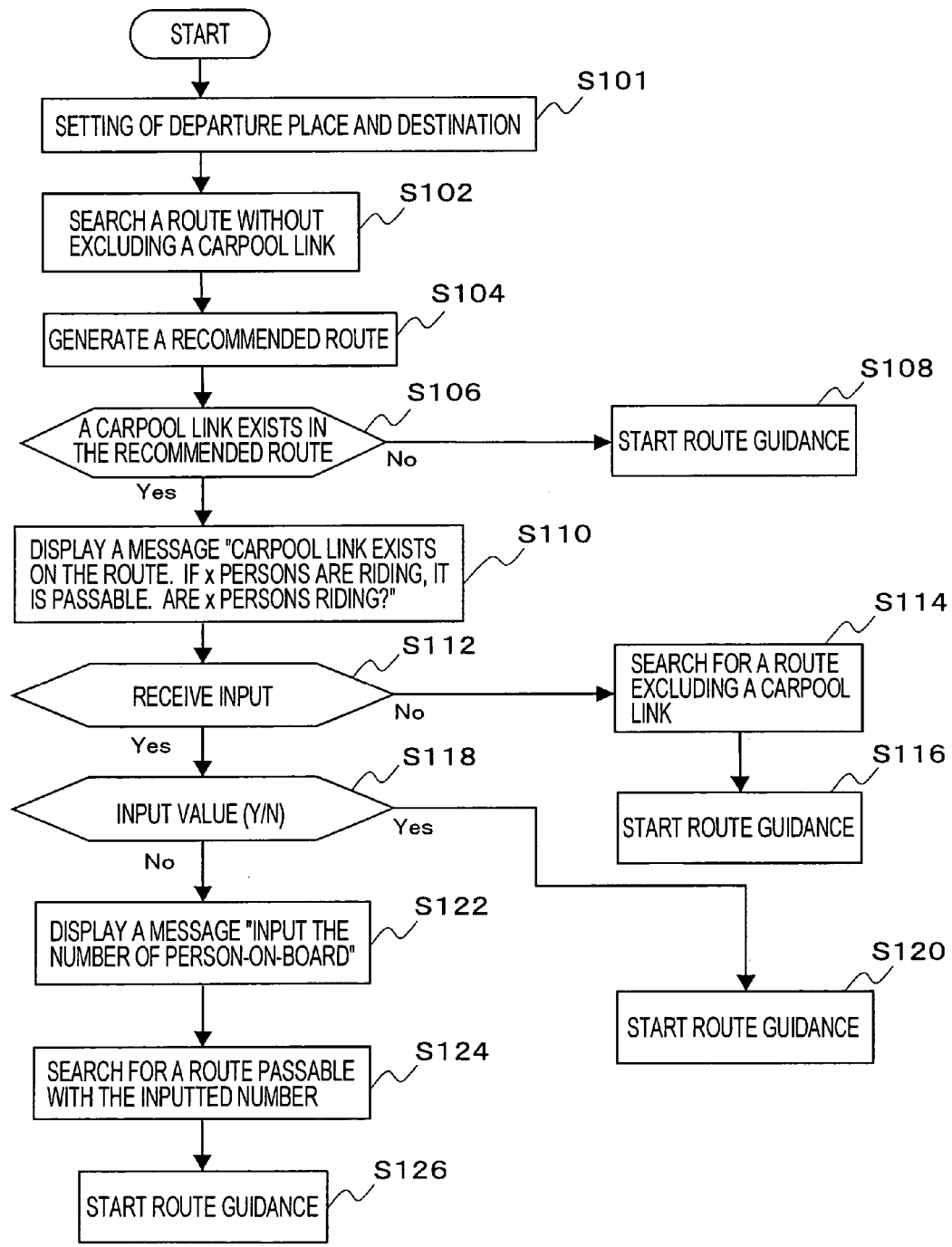
FIG. 5 is a flow diagram for explaining a recommended route search operation of the in-vehicle type navigation system to which the present embodiment has been applied.

FIG. 5 is a flowchart schematically showing an operation of the in-vehicle type navigation system according to the present embodiment. The flow is started when the user operation analyzer 41 receives a user's request to search for a recommended route, through the voice input/output device 4 or the input device 5.

At first, the user operation analyzer 41 sets a departure place, a destination and a departure time in the route search unit 42 (S101).

The user operation analyzer 41 may display information of map constituents registered in the map data read out through the data reading unit 48 from the map data storage device 3, on the display 2 through the menu display processor 50 and the graphics processor 51, and a user may select a departure place and a destination which are set, out of the information of map constituents on the display, through the voice input/output device 4 or the input device 5. Alternatively, information of positions (registered positions) registered in advance by the user in a storage device such as a RAM 22 or the like may be displayed, and the user may select a departure place and a destination out of the information of the registered positions as displayed through the voice input/output device 4 or the input device 5. Further, the user operation analyzer 41 may display a map specified by the map data read out through the data reading unit 48 from the map data storage device 3, on the display 2 through the map display processor 45 and the graphics processor 51, and may receive a designation of a position on the map from the user through the voice input/output device 4 or the input device 5 to select a departure place or a destination.

If the current position is set as a departure place, it is possible to omit a designation of the departure place by the user. Similarly, if the current time is set as a departure time, it is also possible to omit a designation of the departure time by the user.

After the setting of the departure place, destination and departure time in the route search unit 42 as thus described, the user operation analyzer 41 outputs a route search instruction to the route search unit 42.

Upon receipt of this instruction, the route search unit 42 searches for a recommended route from the departure place to the destination (S102). Specifically, the route search unit 42 makes a calculation based on the coordinate information (latitude, longitude, and the like) and specifies a mesh ID of the mesh area including a specific point, from the map data storage device 3 through the data reading unit 48. Next, the route search unit 42 obtains from the map data storage device 3 through the data reading unit 48, link data 312 registered in each of the map data items 31 having thus specific mesh ID. Then, according to the Dijkstra method or the like, the route search unit 42 determines a route with the minimum cost (travel time or travel distance) as a recommended route. The processing here is performed without considering whether or not each of the links constituting the recommended route includes a carpool lane. Subsequently, the link ID 3121 and link data 312 of each of the links constituting the recommended route are stored in the route storage unit 43 (S104).

Next, the route search unit 42 checks whether or not the links constituting the recommended route contains a carpool link (S106). Specifically, the route search unit 42 firstly refers to the carpool information 3126 of the link data 312 with respect to each of the links constituting the recommended route, which are stored in the route storage unit 43. Then, the route search unit 42 checks whether or not the recommend route contains a carpool link, assuming that a constituent link whose lanes are all carpools lanes is a carpool link. At this moment, if the carpool information 3126 includes a time zone during when a constituent link is controlled to be a carpool link, a time period when the vehicle will pass through the constituent link is taken into account. Specifically, based on the departure time, a time when the vehicle will arrive at the start point of the constituent link is calculated. If the time when the vehicle passes through the constituent link is included in the time zone when the link is controlled to be the carpool link, the constituent link is treated as a carpool link.

If any of the links constituting the recommended route is not a carpool link (No in S106), the route search unit 42 instructs the route guidance unit 44 to start the route guidance, by use of the recommended route stored in the route storage unit 43 (S108).

On the other hand, if at least one of the links constituting the recommended route is a carpool link (Yes in S106), the route search unit 42 performs processing to inform the user that there exists a carpool link in the recommended route (S110). At this moment, the route search unit 42 instructs the map display processor 45 to display the recommended route on a map. Furthermore, the route search unit 42 instructs the menu display processor 50 to display a message informing the user that there exists a carpool link in the recommended route and information as to the number of persons-on-board which allows the vehicle to pass through the carpool link. In addition, the route search unit 42 instructs the menu display processor 50 to display a message inquiring the user whether or not there are riding persons of the number allowing the vehicle to pass through the carpool link. The map display processor 45 and the menu display processor 50 instruct the graphics processor 51 to display the descriptions as instructed by the route search unit 42 on the display 2.

Figure 6:
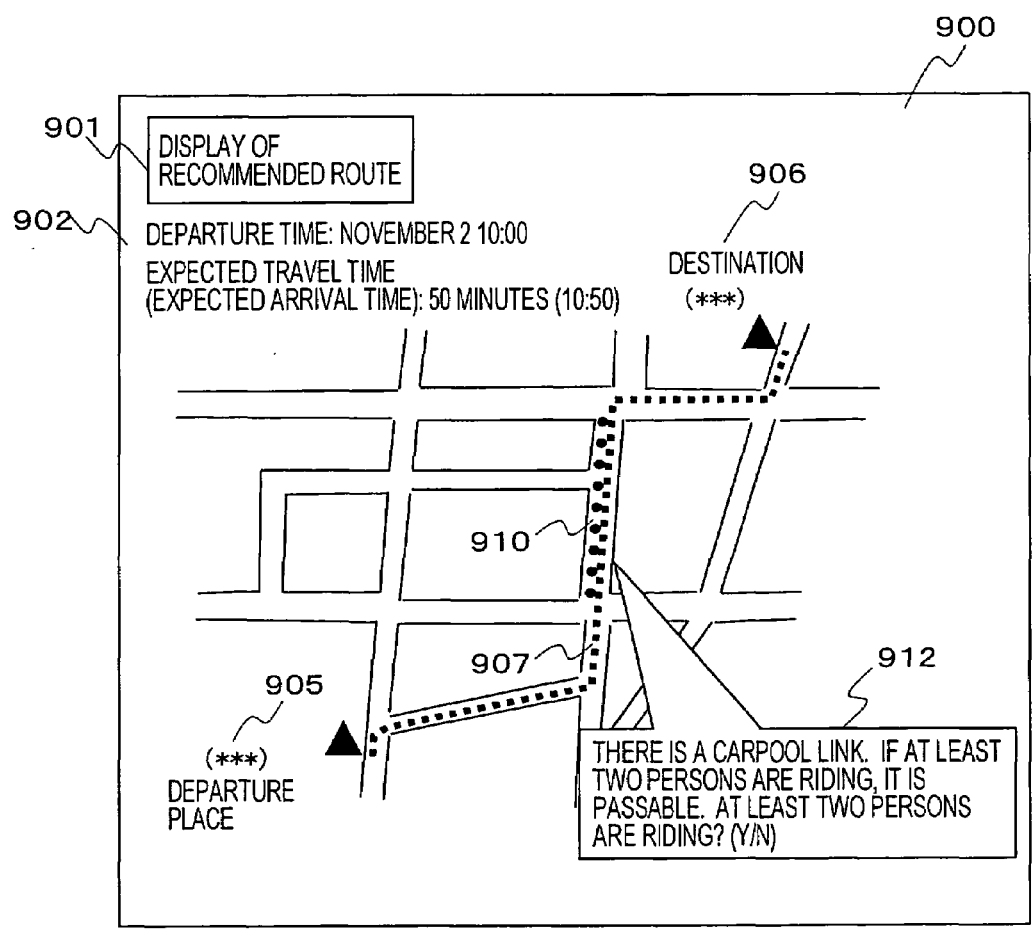
FIG. 6 is an illustration showing a display example of the recommended route on a display 2.

FIG. 6 is an example of display screen 900 on the display 2. On the display screen 900, there is displayed a recommended route 907 from the departure place 905 to the destination 906 on the map, together with the departure time 901 and the expected travel time 902. In addition, the carpool link 910 is displayed in such a manner that a display mode of the link on screen is differentiated from that of other links, for example, by differentiating a color on the screen, so that the user easily recognizes that the link is a carpool link. Furthermore, there is displayed a message 912 informing the user that a carpool link exists in the recommended route with the information as to the number of persons-on-board required to pass through the carpool link, and inquiring the user whether or not the persons of the required number or more are currently riding on the vehicle. It is to be noted that the message 912 may be outputted via voice through the voice input/output device 4.

When the screen as shown in FIG. 6 is displayed, the route search unit 42 waits for a response to the question whether or not the persons of the required number or more are currently riding on the vehicle. The user operation analyzer 41 analyzes the description of the response inputted by the user through the input device 5, and the route search unit 42 receives a result of the analysis, whereby the receive processing is carried out.

If there is no input of response even after a lapse of a predetermined input stand-by time (for example, one minute) (No in S112), the route search unit 42 newly conducts a search for a recommended route, excluding the carpool link, and stores the route thus searched as a recommended route in the route storage unit 43 (S114). Then, the route search unit 42 instructs the route guidance unit 44 to start the route guidance by use of the recommended route (S116).

On the other hand, if a response is inputted within the input stand-by time, the route search unit 42 checks the description of the response (S118). If the description of the response is "Yes", that is, the persons of at least the number required for passing through the carpool link are riding (Yes in S118), the route search unit 42 instructs the route guidance unit 44 to start the route guidance along the recommended route stored in the route storage unit 43 (S120).

On the other hand, if the description of the response is "No", that is, the persons of at least the number required for passing through the carpool link are not riding (No in S118) the route search unit 42 instructs the menu display processor 50 to output a message inviting the user to input the number of person-on-board. In receipt of this instruction, the menu display processor 50 displays a message on the display 2, such as "Input the number of person-on-board". It is to be noted that this message may be outputted via voice through the voice input/output device 4.

When the user inputs the information as to the number of person-on-board via the input device 5 or the voice input/output device 4, the route search unit 42 receives this information through the user information analyzer 41. Then, the route search 42 searches for a route passable with the number of person-on-board thus inputted. Specifically, when the route search unit 42 refers to the link data 312 in the route search, it refers to the carpool information 3126 as well, and searches for a recommended route excluding the links not passable with the inputted number of person-on-board from candidates for the constituent links of the recommended route. For example, if the number of person-on-board is one, the link whose lanes are all carpool lanes requiring at least two persons to pass through the link, is treated as a non-passable link. On the other hand, even if the link contains a carpool lane, it is treated as a passable link as far as there is included a lane which is passable with the number of person-on-board thus inputted. Then, the route search unit 42 stores in the route storage unit 43, the route thus searched as a recommended route (S124). Next, the route search unit 42 instructs the route guidance unit 44 to start the route guidance along the recommended route stored in the route storage unit 43 (S126).

Figure 7:
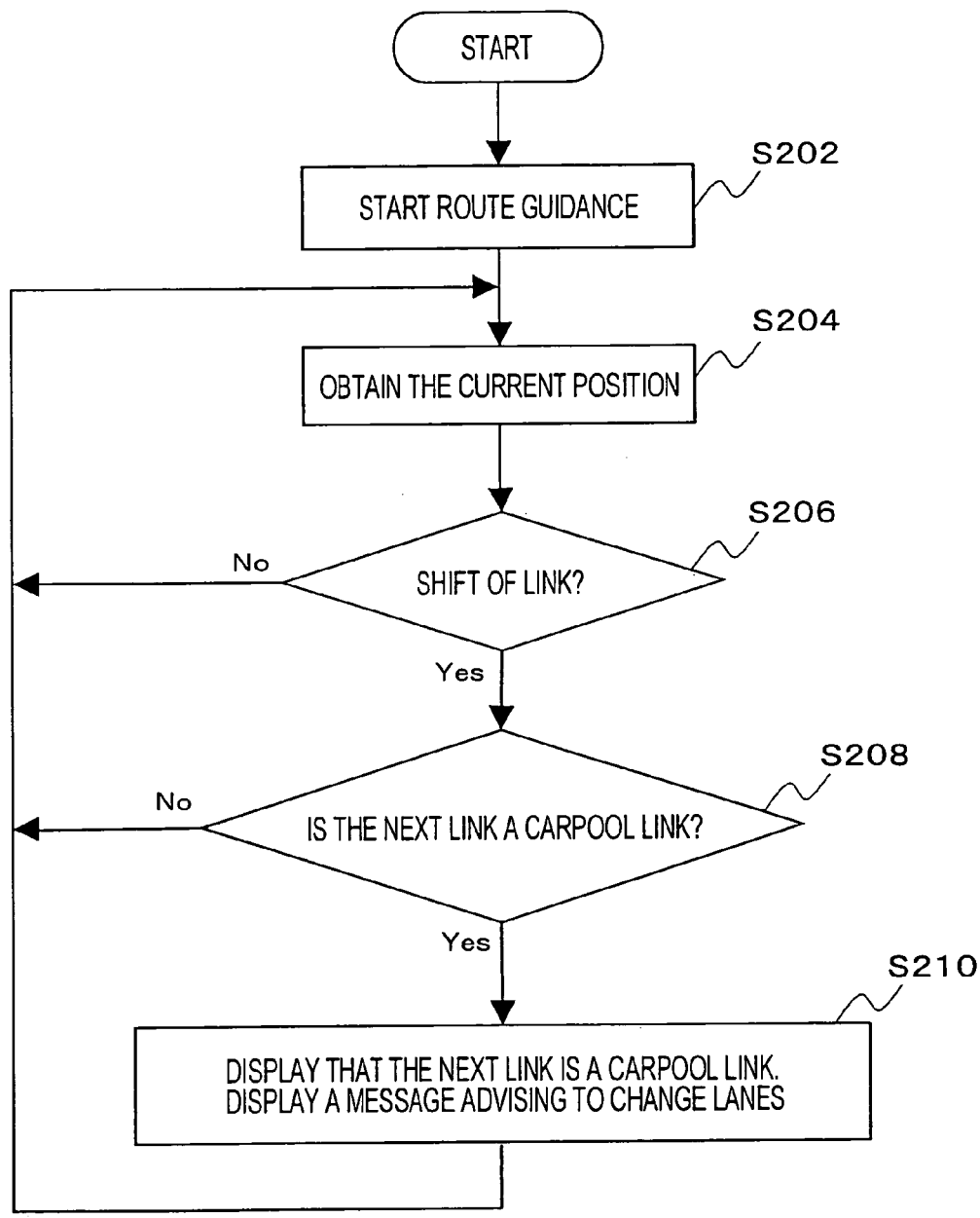
FIG. 7 is a flow diagram for explaining a route guidance operation of the in-vehicle type navigation system to which the present embodiment has been applied.

Next, an operation regarding the route guidance will be explained. FIG. 7 is a flow diagram schematically showing a flow of the route guidance processing. After the recommended route search processing is completed, the route search unit 42 instructs a start of the route guidance, whereby the route guidance processing is started. Alternatively, the route guidance processing is started when the user operation analyzer 41 accepts a route guidance request from a user through the voice input/output device 4 or the input device 5.

The route guidance unit 44 utilizes the map data 310 stored in the map data storage device 3 and link data of the links constituting the recommended route stored in the route storage unit 43, and starts the route guidance with a general (conventional) route guidance technique (S202).

During the route guidance processing, when a current position is newly outputted from the map matching processor 47 (S204), the route guidance unit 44 determines whether or not the current position is shifted from a certain link constituting the recommended route as a target of the route guidance, to the next link (S206). If it is not shifted ("No" in S206), the route guidance unit 44 returns to S204 and waits until a current position is newly outputted from the map matching processor 47.

On the other hand, if it is shifted to the next link ("Yes" in S206), the route guidance unit 44 refers to the carpool information 3126 of the link data 312, and checks whether or not a link further next to the link, to which the current position has been shifted, is a carpool link. At this moment, if the link comprises a plurality of lanes, it is further checked whether or not there exists a carpool lane (S208). If the link is neither a carpool link nor a link including a carpool lane ("No" in S208), the route guidance unit 44 returns to S204 and waits until a current position is newly outputted from the map matching processor 47.

Figure 8:
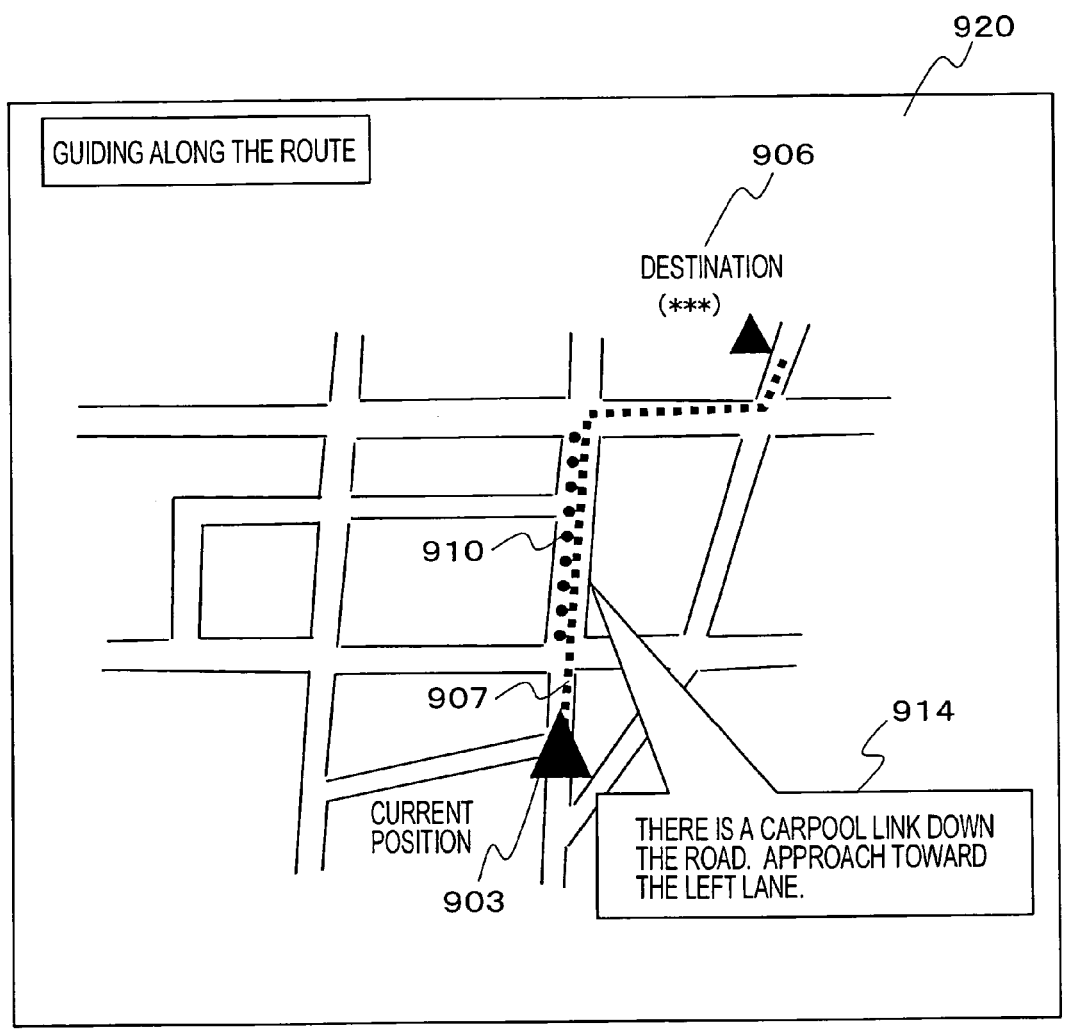
FIG. 8 is an illustration showing a display example of the guidance route on the display 2 during the guidance along the route.

On the other hand, if the link is a carpool link, or a link including a carpool lane ("Yes" in S208), the route guidance unit 44 instructs the menu display processor 50 to output a message which informs the user that the next link is a carpool link or the link including a carpool lane. At this moment, if the next link includes a carpool lane, the route guidance unit 44 checks how the carpool lane is positioned (for example, left lane), and instructs the menu display processor 50 to output a message indicating to which lane the vehicle is to approach. Upon receipt of this message, as shown in FIG. 8, the menu display processor 50 displays on the display screen 920 of the display 2, a message 914 to inform the user that the next link is a carpool link or it is a link including a carpool lane. In addition, a message informing the user which lane the vehicle is to approach is also displayed.

Specifically in FIG. 5, if the route guidance is started after the step S108 or S116, a carpool link (a link in which all the lanes are carpool lanes) is not included in the recommended route, but a link partially containing a carpool lane may be included therein. In such a case, the user is informed that there is a carpool lane prior to getting thereto, and how many persons are required to be riding to pass through the carpool lane. For example, a message such as "There is a carpool lane down the road. If the number of persons required to pass through the carpool lane are riding (two persons), drive the car to approach the carpool lane (left lane)" is displayed.

Further in FIG. 5, if the route guidance is started after the step S120 or S126, the recommended route includes a carpool link passable with the number of person riding in the vehicle. Therefore, for example, a message such as "There is a carpool link down the road." is displayed. When the vehicle passes through the link including a carpool lane, the route guidance unit 44 determines whether or not the carpool lane is passable with the number of persons riding in the vehicle. If the carpool lane is passable, a message such as "Persons of the number required to pass through the carpool lane ahead, (two persons), are now riding. Drive the car to approach to the carpool lane (the left lane)" is displayed. On the other hand, if the carpool lane is not passable, a message such as "There is a carpool lane down the road. Persons of the number required to pass through the carpool lane (three persons) are not riding. Drive the car away from the carpool lane (the left lane)" is displayed.

The message and the like informing that the next link is a carpool link may be outputted when a distance up to the next link reaches a predetermined value. Further, the message may be outputted via voice through the voice input/output device 4.

When the processing in S120 is completed, the route guidance unit 44 returns to S204, and waits until a current position is newly outputted from the map matching processor 47.

After the processing as described above is carried out up to the time of arrival at the destination, the route guidance unit 44 completes the route guidance processing.

According to the route guidance processing as described above, it is possible to inform the user in advance that there is a carpool link (lane) down the road. Therefore, the user can easily change lanes and it is convenient for the user.

When the carpool link (lane) is approaching an end, it may also be possible to output a message indicating the situation. If the user knows in advance that the carpool link (lane) is coming to an end, it is possible for the user to be prepared for lane change, and thus excellent usability is provided.

As thus described, one embodiment of the present invention has been explained.

It is to be noted here that the present invention is not limited to the above embodiment, and it should be understood that disclosed embodiment is susceptible of changes and modifications without departing from the scope of the invention.

For example, in the above embodiment, the information of the number of person-on-board is obtained from an input by the user. However, it may also be possible to provide a system for detecting the number of person-on-board. For example, in order to detect the number of person-on-board, there are a system where infrared sensors are provided with respect to each seat to sense an existence of a person so as to recognize the number of person-on-board, a system where a contact sensor, a pressure sensor and the like are mounted on each seat to sense a deformation of the seat when a person sits thereon so that the number of person-on-board is recognized, and a system where a device for detecting the weight is mounted so as to recognize the number of person-on-board according to the weight thus detected.

Furthermore, in the above embodiment, it is configured such that when a carpool link is included in the links constituting the recommended route, the user is inquired how many persons are riding. However, it is also possible to configure such that the user is allowed to input the number of person-on-board in advance. For example, it is possible to configure such that a previous input of the number of person-on-board is received, and after the route search, only in the case where there is included in the recommended route a link which is not passable with the number of person-on-board thus inputted, it is announced to the user, and another route search may be conducted in accordance with a request from the user.

In addition, it is also possible to configure such that a regular number of persons in the vehicle on which the in-vehicle navigation system is mounted, is stored in the number of person-on-board storage unit 55. In this case, upon conducting the route search, the route search unit 42 may check with the user whether or not the current number of person-on-board is equal to the regular number of person-on-board. Then, if it is equal to the number stored in the number of person-on-board storage unit 55, searching is conducted for a recommended route comprising links (lanes) passable with the number of person-on-board. On the other hand, if it is not equal to the number stored in the number of person-on-board storage unit 55, firstly an input of the number of person-on-board is received and then searching is conducted again for a route which is passable with the number of person-on-board thus inputted.

Figure 9:
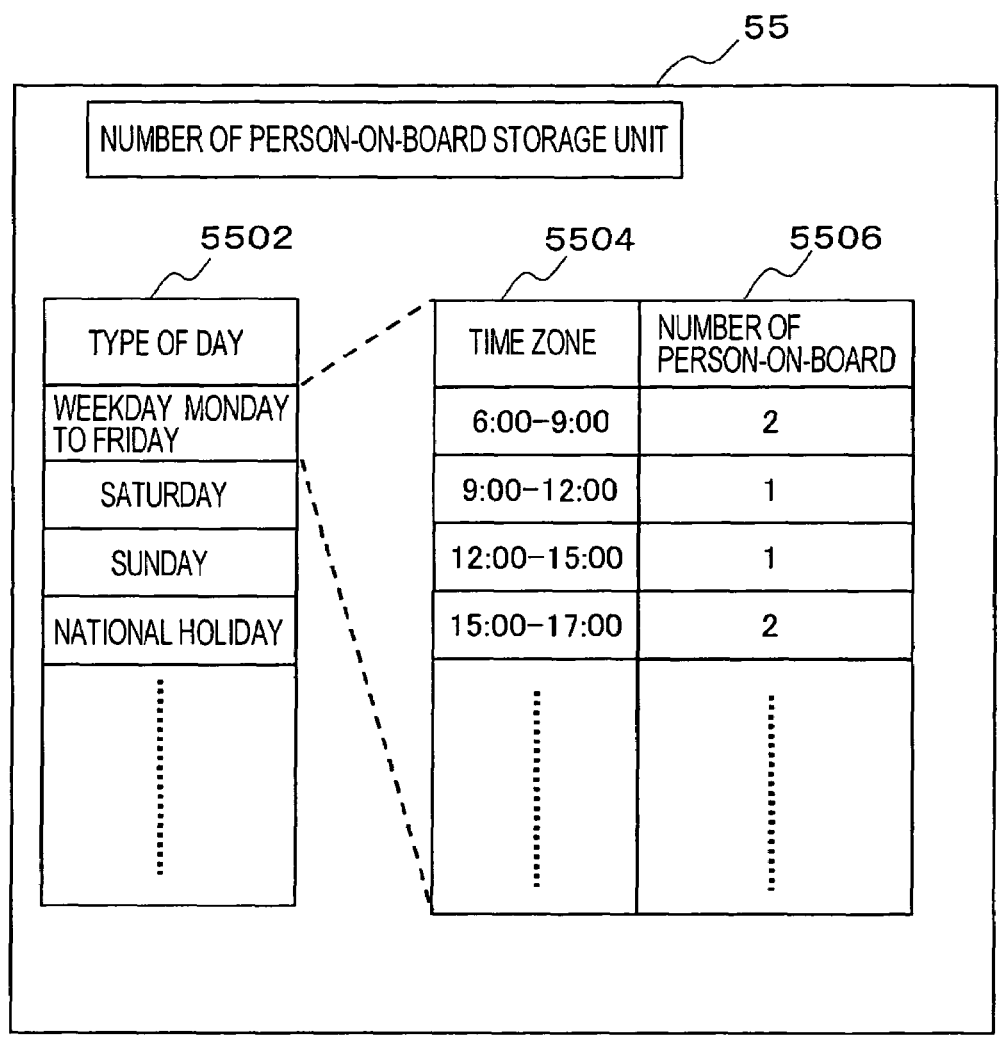
FIG. 9 is an illustration showing a configuration example as to the number of person-on-board information which is stored in the number of person-on-board storage unit 55.

In addition, as shown in FIG. 9, the number of person-on-board storage unit 55 may further store the number of person-on-board 5506, by type of day 5502 (for example, weekday, holiday and the like) and time zone 5504 (from 7:00 to 10:00, from 17:00 to 20:00, morning, daytime, night, for example). With this configuration, if the number of persons is fixed depending on the time zone to some extent, it is possible to store in advance some numbers, for example, two persons during a commute time, one person at daytime on weekdays, three persons on Sundays, and the like. Such previous settings may reduce a cumbersome procedure of inputting every time, and give the user an excellent usability. In order to achieve this configuration, at the time of conducting a route search, the route search unit 42 searches for the number stored in the number of person-on-board storage unit 55, based on the information of departure date and time, and then searches for a recommended route comprising links (lanes) passable with the number of person-on-board thus searched. Even in this case, it is also possible to configure such that the route search unit 42 checks with the user, at the time of conducting the route search, whether or not the number of persons now riding is equal to the regular number of person-on-board which is stored in the number of person-on-board storage unit 55.

It is to be noted that the embodiment above has been explained assuming that the present invention has been applied to an in-vehicle type navigation system. However, the present invention may be applied to a navigation system other than the in-vehicle type navigation system.

As discussed above, according to the present invention, it is possible to provide a technique to conduct a search for a recommended route, considering how many persons are riding in the vehicle.

What is claimed is:

1. A route search method in an in-vehicle type navigation system, comprising a storage device which stores link data of each of links constituting roads on a map, said link data containing information on a carpool link through which only a vehicle in which a plurality of persons are riding is allowed to pass, wherein, said navigation system carries out:

a first search step which searches for a recommended route from a departure place to a destination by use of said link data, a first route guidance step which starts route guidance using the recommended route when the carpool link is not included in the link constituting the recommended route searched in the first search step, a receive step which receives an input of the number of person-on-board when said carpool link is included in links constituting said recommended route searched in the first search step, a second search step which searches for a recommended route by use of said link data, from said departure place to said destinations, including links passable with said number of person-on-board received in said receive step, and a second route guidance step which starts route guidance using the recommended route that has been searched in the second search step.

2. A route search method in an in-vehicle type navigation system according to claim 1, wherein, if the input of said number of person-on-board is not received in said receive step, said navigation system searches for a recommended route once again from said departure place to said destination, by use of said link data excluding said carpool link.

3. A route search method in an in-vehicle type navigation system according to claim 1, wherein, if the links constituting said recommended route include a carpool link, said navigation system outputs a message informing a user that the links constituting said recommended route include the carpool link.

4. A route search method in an in-vehicle type navigation system according to claim 1, wherein, if the links constituting said recommended route include a carpool link, a mode for displaying said carpool link is differentiated from other links.

5. A route search method in an in-vehicle type navigation system according to claim 1, wherein, said navigation system, comprises a current position detecting function, on the basis of current position information detected by said current position detecting function, displays said recommended route on a map surrounding said current position, and if said carpool link is included in the links constituting said recommended route thus displayed, outputs a message informing the user that there exists a carpool link in the recommended route, prior to reaching to said carpool link.

6. A route search method according to claim 1, wherein, the storage device stores information as to a number of person-on-board by day and time, and said receiving step obtains a number of person-on-board of the current day and time out of the information as to the number of person-on-board stored in said storage device.

7. A route search method in an in-vehicle type navigational system according to claim one 1, wherein, the receive step obtains a number of person-on-board from a weight measured by a device for detecting the weight.

8. An in-vehicle type navigation system comprising, a storage device which stores link data of each of links constituting roads on a map, the link data containing information on a carpool link, through which only a vehicle in which a plurality of persons are riding is allowed to pass, a first search means which searches for a recommended route from a departure place to a destination, by use of said link data, a first route guidance means which starts route guidance using the recommended route searched in the first search means if the carpool link is not included in the link constituting the recommended route, a receive means which receives an input of the number of person-on-board, if said carpool link is included in said links constituting said recommended route, and a second search means which searches for a recommended route by use of said link data, from the departure place to the destination including links passable with the number of person-on-board received by said receive means, and a second route guidance means which start guidance using the recommended route searched by the second search means.

* * * * *